(12) United States Patent
Noca et al.

(10) Patent No.: US 10,962,441 B2
(45) Date of Patent: Mar. 30, 2021

(54) WIND GENERATION MEANS AND WIND TEST FACILITY COMPRISING THE SAME

(71) Applicant: Haute Ecole du Paysage, D'Ingénierie et D'Architecture de Genève, Geneva (CH)

(72) Inventors: Flavio Noca, Pampigny (CH); Guillaume Catry, Bernex (CH)

(73) Assignee: Haute Ecole du Paysage, D'Ingénierie et D'Architecture de Genève, Geneva (CH)

( * ) Notice: Subject to any disclaimer, the term of this patent is extended or adjusted under 35 U.S.C. 154(b) by 299 days.

(21) Appl. No.: 16/310,126

(22) PCT Filed: Jun. 13, 2017

(86) PCT No.: PCT/EP2017/064451
§ 371 (c)(1),
(2) Date: Dec. 14, 2018

(87) PCT Pub. No.: WO2017/216188
PCT Pub. Date: Dec. 21, 2017

(65) Prior Publication Data
US 2019/0178749 A1 Jun. 13, 2019

(30) Foreign Application Priority Data
Jun. 14, 2016 (EP) .................................. 16174482

(51) Int. Cl.
*G01M 9/00* (2006.01)
*G01M 9/04* (2006.01)

(52) U.S. Cl.
CPC .................................... *G01M 9/04* (2013.01)

(58) Field of Classification Search
CPC .............................. G01M 9/04; G01M 17/007
See application file for complete search history.

(56) References Cited

U.S. PATENT DOCUMENTS

| 8,951,012 B1 | 2/2015 | Santoro |
| 10,180,372 B2 * | 1/2019 | Gulker ................ G01M 17/007 |

(Continued)

OTHER PUBLICATIONS

International Search Report dated Nov. 29, 2017.

*Primary Examiner* — Francis C Gray
(74) *Attorney, Agent, or Firm* — Dinsmore & Shohl LLP; Weston R. Gould

(57) ABSTRACT

The invention relates to a wind generation means (1) comprising at least one wind generation wall (1') comprising a plurality of wind generation units (11) provided next to each other along at least a first and a second directions so as to form the at least one wind generation wall (1'), wherein each wind generation unit (11) of said plurality of wind generation units comprises at least two ventilation units (111), each ventilation unit within the wind generation unit being individually controlled, characterized in that each wind generation unit (11) of said plurality of wind generation units comprises at least one control unit adapted to control said ventilation units (111) individually, so as to generate an arbitrary wind profile both in space and in time in an air flow path and so as to vary a generated wind physical property of said each wind generation unit along said at least first and second directions, and in that said plurality of wind generation units (11) are detachably attached to each other so that the size and shape of the said wind generation wall (1') can be varied.

11 Claims, 5 Drawing Sheets

(56) References Cited

U.S. PATENT DOCUMENTS

| | | | |
|---|---|---|---|
| 10,345,191 B2 * | 7/2019 | Walter | G01M 9/04 |
| 2002/0083763 A1 * | 7/2002 | Li | G01M 9/02 |
| | | | 73/147 |
| 2002/0117224 A1 * | 8/2002 | Vakili | F15D 1/02 |
| | | | 138/39 |
| 2013/0063888 A1 * | 3/2013 | Wang | H05K 7/20736 |
| | | | 361/679.48 |
| 2015/0020586 A1 * | 1/2015 | Kerestan | G01B 5/14 |
| | | | 73/147 |
| 2016/0157389 A1 * | 6/2016 | Hwang | H05K 5/0213 |
| | | | 361/679.46 |

\* cited by examiner

WIND GENERATION MEANS AND WIND TEST FACILITY COMPRISING THE SAME

The invention relates to a wind generation means and to a wind test facility preferably for drones, more preferably for small air-vehicles comprising such a wind generation means.

It is well known in the art that wind tunnels are very useful for testing aerodynamic performance of different type of devices. These devices can include scaled-down models of aircrafts or full-scale portions of aircrafts, like an aircraft tail for example. The testing process of these wind tunnels generally consists in placing the object to be tested in an air flow path and then generating a laminar wind profile, of high speed, and calculating aerodynamic properties of the object related to flow forces. As one can imagine, testing an aircraft tail requires an extraordinary large wind tunnel and a very high wind speed generation to create flying conditions. In order to achieve such testing, the conventional wind tunnels are usually generating steady winds having a flat wind profile and laminar flows. These tunnels are therefore of large size and footprint. Moreover, their test platforms are hardly modifiable.

Since a few years, one sees that the use of small air-vehicles, like drones, that are also commonly called NAVs for Nano Air Vehicles or MAVs for Micro Air Vehicles, becomes more and more important. Therefore, in the same manner as for conventional large aircrafts, these small (for Nano or micro) air vehicles need to be tested in wind tunnels in order to analyze and to improve their flight performances. However, as is easily understood, there is a huge difference between testing these kind of small air-vehicles compared to the large ones, in that for the large aircraft, testing can ignore turbulent flows like shear, vortices and gusts since these phenomena have little effect on large aircraft. To the contrary, these phenomena have an important effect on small air-vehicles like drones or the like, since shear and gusts actually modify the small air-vehicle behavior during flight. Conventional tunnels are therefore not adapted to these new small air-vehicles like drones or the like. There is, therefore, a need for a wind test facility adapted to these new small air vehicles that is capable of generating specific wind conditions that will be encountered by the small air-vehicle upon use.

A great number of wind tunnels are ducted, which means that flow is conveyed through various conduits that have solid walls. The presence of walls is not an issue for conventional testing whereby the test models are firmly attached to a sting or platform. However, for free-flying drones, walls create a collision danger.

In traditional wind tunnel methodology, aerodynamic performance is evaluated through the use of transducers, which measure the force generated by wind flows over the test object. In order to do so, the test model has to be firmly attached to the transducer, which is itself anchored to the wind tunnel structure. Such a configuration does not allow a test model to fly freely. Understandably, it would be difficult to imagine how flow forces could be measured on untethered flight models.

In view of the above problem, the instant inventors have looked for technical solutions to these problems and have realized the present invention that will be described below.

A first object of the invention is therefore to provide a wind generation means adapted to easily generate a wind profile similar to the wind profile to which small air vehicles like drones or the like are subjected in real flight conditions, e.g. in an urban or countryside environment.

More particularly, a further object of the invention is to provide a wind generation means adapted to easily generate a non laminar wind flow or typical turbulent conditions such as profiled wind, gusts, turbulent flow and bad weather.

Further, another object of the invention is to provide a wind test facility where the small air-vehicles, also called drones, can perform unconstrained maneuvers without the risk of being damaged.

Another object of the invention is to provide a methodology of measuring aerodynamic performance of freely flying air-vehicles.

Finally, another object of the invention is to provide a modular wind test facility for small air-vehicles that is easy to use and to manipulate, and that can be modified easily and adapted to a specific air-vehicle or test scenario.

A first aspect of the invention relates to a wind generation means comprising at least one wind generation wall, comprising a plurality of wind generation units provided next to each other along at least a first and a second directions so as to form the at least one wind generation wall. Each of the wind generation unit is composed by at least two ventilation units, each ventilation unit within the wind generation unit being individually controlled. At least one control unit is adapted to each of said plurality of wind generation unit so as to control independently each of said plurality of ventilation units comprised in the wind generation unit. The possibility of controlling each of the ventilation unit independently allows to generate a specific wind profile in an air flow path, so as to modify the specific wind profile both in space and in time. Therefore, it is possible to generate shears and gusts and to modify the type of turbulence during the test. Moreover, since each ventilation unit is controlled independently in the at least two directions, one can easily create any type of turbulences and the turbulence level is adjustable in real time without the use of screens or turbulators, and the scale of flow structures in the vortices is adjustable according to the size of the small air-vehicle. The plurality of wind generation units are detachably attached to each other so that the size and shape of the said wind generation wall can be varied. Thanks to this, the modularity of the wind generation means is exceptional as it can adapt to the drone to be tested but it also can be adapted to the type of environment where that test has to be carried out.

A preferred embodiment of the invention consists in that each ventilation unit is composed of two contra-rotative ventilation fans mounted in series. Therefore, one reduces the generation of uncontrolled and undesired turbulences.

Preferably, the wind generation means further comprises, in the air flow path, a first frame having a honeycomb structure and a second frame providing a plurality of homogenization chambers mounted to the wind generation units. These systems act like a filter for undesired vortices generated by the fans and also render the wind profile of each wind generation unit more homogeneous so as to obtain more accurate data during the test and or a better control of the wind generation.

A preferred embodiment of the invention consists in that each ventilation unit is provided with its specific homogenization chamber. Thanks to this, one renders the wind profile of each ventilation unit even more homogeneous.

A second aspect of the invention relates to a wind test facility for small air-vehicles comprising a wind generation means according to the first aspect of the invention.

A preferred embodiment of the invention consists in that the wind test facility further comprises a position sensing means for a small air-vehicle adapted to detect the position of the small air-vehicle in relation to the wind test facility. Therefore, the drones can be maintained under control in the wind tunnel.

Preferably, the position sensing means for the small air-vehicle comprises at least one of a vision camera system and an air-vehicle-embedded sensor, like an active GPS signal. Thanks to this the drone can be in free flight during the test without the need of a sting or force measuring instruments.

A preferred embodiment of the invention consists in that the wind test facility further comprises a calculating means for calculating aerodynamic forces acting on the small air-vehicle based on signals of said position sensing means, preferably in addition with data from the engine of the drone for said small air-vehicle, an accelerometer and a gyroscope inside said drone. Therefore, the drone aerodynamic performances like lift, drag, moment, stability or the like, can be easily evaluated without the help of balance or conventional force measuring instrument.

Advantageously, the wind test facility further comprises a specific weather condition generating means adapted to introduce a weather condition within the air flow path. Thanks to this, the drone aerodynamic performance results are likely to be even more accurate.

Preferably, the air flow path is an open-duct wind tunnel. Therefore, there is no risk of damaging the small air-vehicle.

A preferred embodiment consists in that the wind generation means comprises pivoting means. Thanks to this, at least a portion of the wind generation means is movable so as to modify the direction of the air flow path.

Preferred embodiments of the present invention will now be described with reference to the attached drawings that should be considered as illustrative and not limitative, where:

In the present text, one preferably uses the term "small air-vehicle", however this term shall not be limited to flying objects as it more generally concerns any test subject for which real wind conditions testing is important as they are air has an impact on their behavior when subjected to it.

Figure 1A:
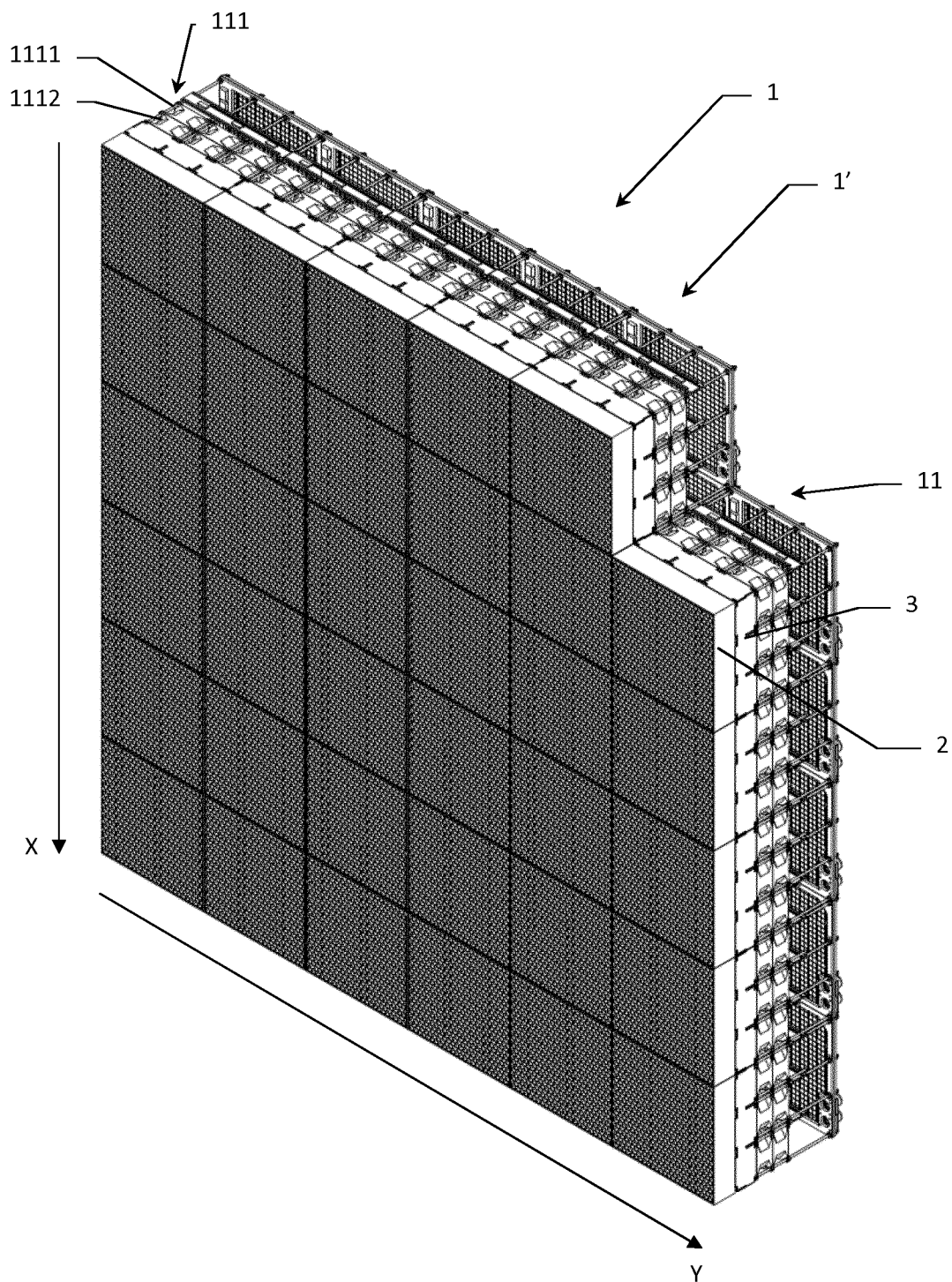
FIG. 1A represents a perspective view of a preferred embodiment of a wind generation means of the present invention.

The FIG. 1A represents a perspective view of a preferred embodiment of a wind generation means 1 of the present invention.

As represented in this figure, the wind generation means 1 comprises a single wind generation wall 1' which in turn comprises a plurality of wind generation units 11, here thirty-five but the invention is clearly not limited thereto, provided, or stacked, next to each other along a first direction represented by the arrow Y, here horizontal, and a second direction represented by the arrow X, here vertical, so as to form a wind generation wall 1'. It is important to note that these directions are not necessarily straight and may be curved, if, for example, the wind generation wall 1' has a curved shape like shown in FIG. 1B. The air flow path mentioned here relates to a volume where the wind profile may be modified through the use of the wind generation means 1. As one can easily imagine, a wind generation means 1 comprises a blowing side, downstream to the wind generation means 1, and an aspirating side, upstream to the wind generation means 1, both being part of the air flow path. This means that the air flow path may be on one or both sides of the wind generation means 1, and that the air flow path actually crosses the wind generation means 1.

Figure 1B:
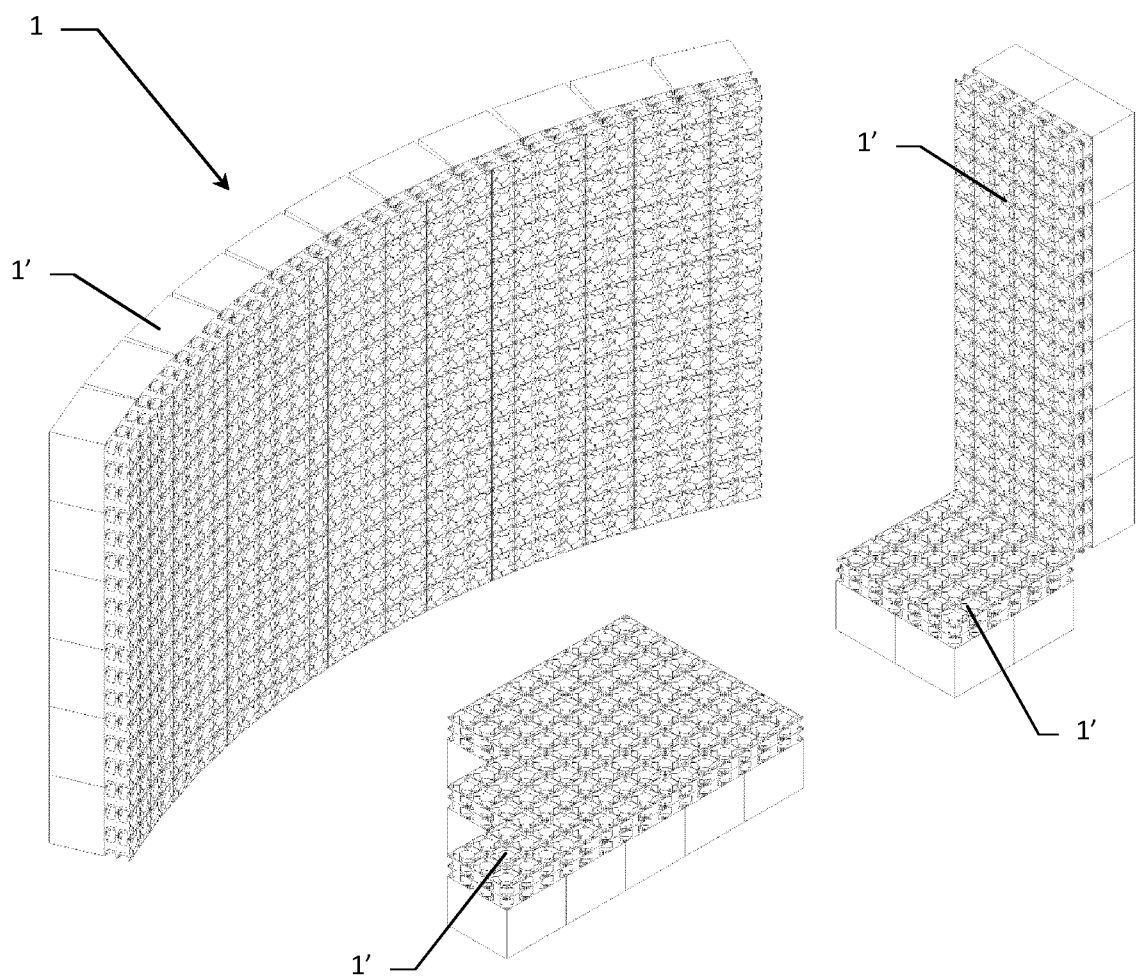
FIG. 1B represents various geometrical configurations and arrangements of the preferred embodiment of the wind generation means of the present invention.

As it can be understood by looking into FIG. 1B, the wind generation means 1 may comprise a plurality of wind generation walls 1', here three, each comprises a particular number and configuration of wind generation units 11 which are detachably attached to each other to form the wind generation means 1. More particularly, as seen in FIG. 1B, the plurality of wind generation units 11 are detachably attached to each other so that the size and shape and the configuration of the wind generation means 1 can be varied. It is therefore possible to configure the wind generation means 1 so as to have it small enough to be able to carry it or even to configure the shape of it to fit particular spaces or even to provide different wind generation walls 1', for example perpendicular, within the same wind generation means 1 shown in FIG. 1B. The FIG. 1A shows a wind generation means 1 approximately square. However, the present invention is not limited thereto and, as FIG. 1B shows, the wall 1' can be of any shape or size that is desired according to the actual size of the air-vehicle, or the type of wind conditions desired. The detachably fixing means used to attach the wind generation together are not represented in the figures and are not limited as they can be any of conventional knowledge.

Figure 2:
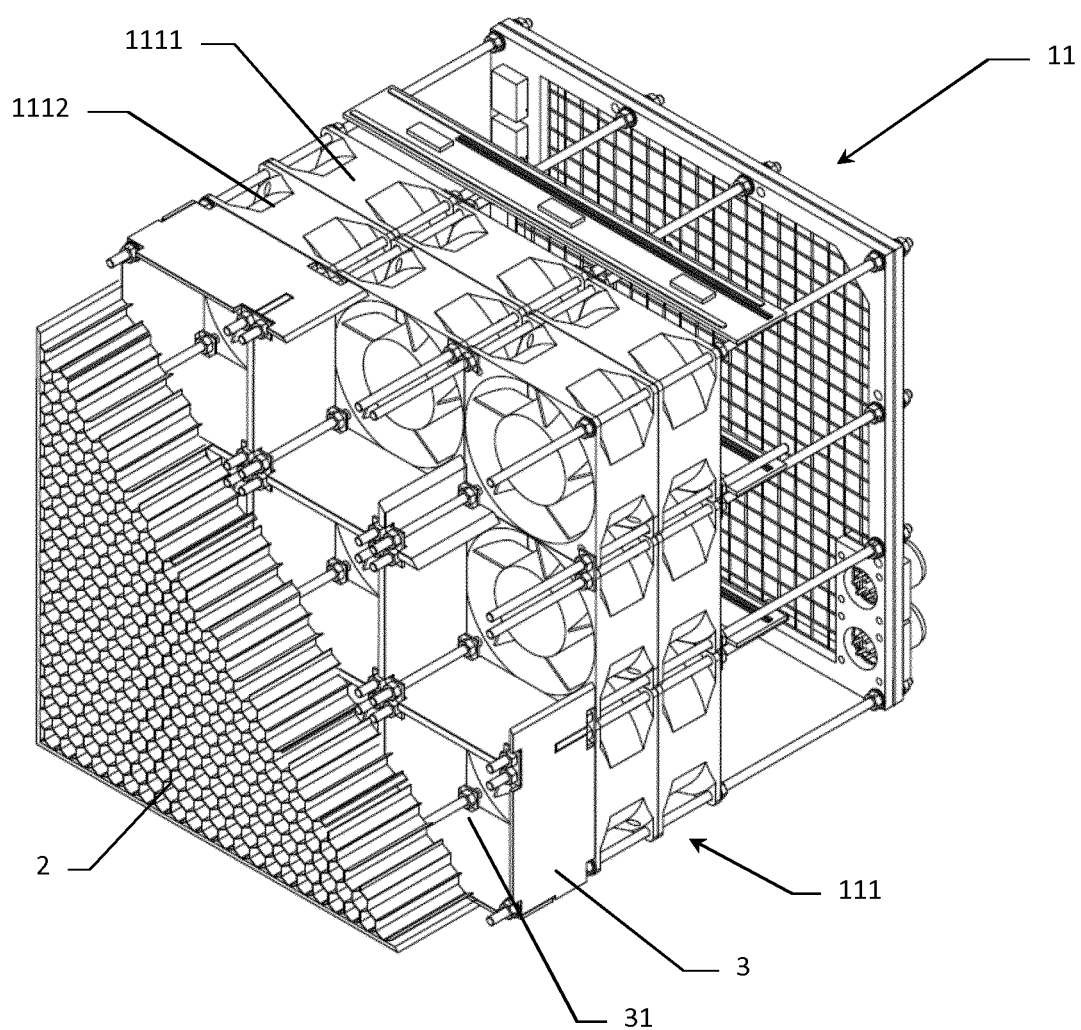
FIG. 2 represents a perspective view of a wind generation unit according to a preferred embodiment of the invention.

The FIG. 2 represents a perspective view of a wind generation unit 11 according to a preferred embodiment of the invention. As it can be seen, each wind generation unit 11 of said plurality of wind generation units 11 represented in FIG. 1 comprises at least two ventilation units 111, the wind generation unit 11 of FIG. 2 is composed of nine ventilation units 111 are arranged in three rows and three columns of three ventilation units 111 each, but the invention is clearly not limited to this configuration and can be different, for example a wind generation unit 11 can be composed of at least two ventilation units 111. Also, each ventilation unit 111 can be composed of two contra-rotative ventilation fans 1111, 1112 mounted in series. By mounted in series, it is meant that they are arranged, or attached, in an adjacent manner along the wind flow path. Any type of fan can be used. While this should not limit the present invention, a wind generation means 1 might comprise over hundred ventilation fans per square meter, thereby allowing a large wind force and wind profile modulation. With this wind generation means 1, a user can generate a wind speed larger than 50 km/h up to 100 km/h or more.

Furthermore, as we can see from FIG. 2, the wind generation means 1, and more preferably, each wind generation unit 11 further comprises, in the air flow path, but preferably upstream to the ventilation units 111, a first frame 2 having a honeycomb structure and a second frame 3 providing a plurality of homogenization chambers 31 mounted to the wind generation unit 11. Preferably, each ventilation unit 111 is provided with its specific homogenization chamber 31.

Although not represented in the figures, the control unit is a key feature of the present invention as it is adapted to control each ventilation unit 111 within the wind generation unit 11 individually so as to vary a generated wind physical property, e.g. a force, a velocity, an intensity, a temporal variation, a pressure, a direction, and the like, of the each wind generation unit 11 along the first and second directions X, Y so as to modify the specific wind profile both in space and in time. This permits the wind generation units 11 to generate n wind profiles different from each other. Moreover, as each wind generation unit 11 of the plurality of wind generation units 11 comprises at least two ventilation units 111, the control unit is also capable to control each ventilation unit 111 within the wind generation unit 11 individually. The control unit is an electronic device that receives signal from outside a wind generation unit, process this signal, and output a command signal to control ventilation units. There is at least one control unit adapted to each wind generation unit.

Figure 3A:
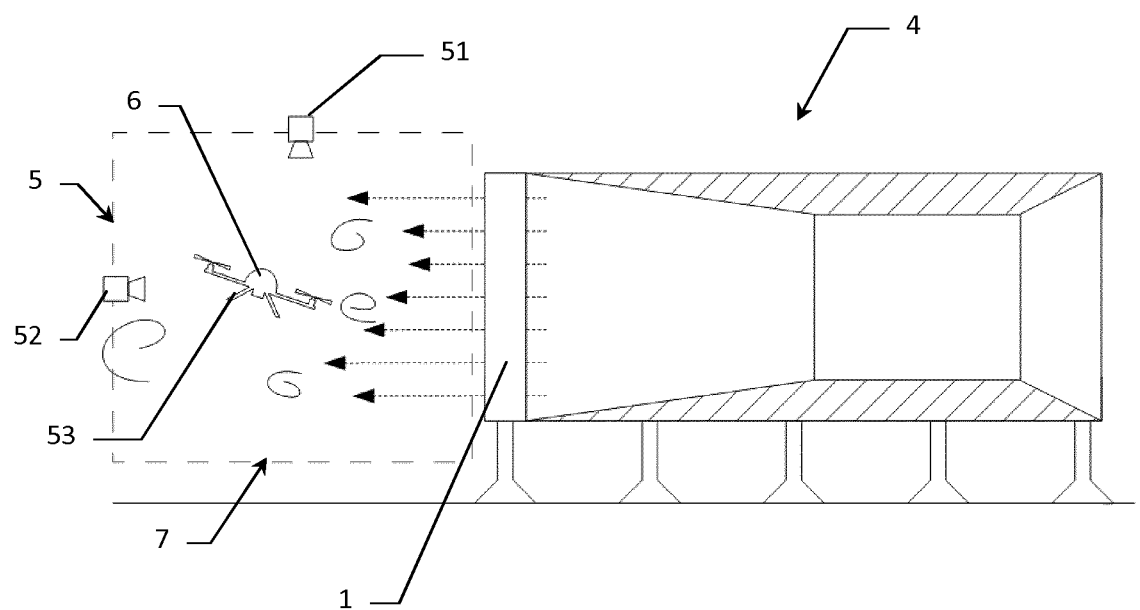
FIGS. 3A to 3C represent a side view of a wind test facility for small air-vehicles comprising a wind generation means according to the first aspect of the invention.
Figure 3B:
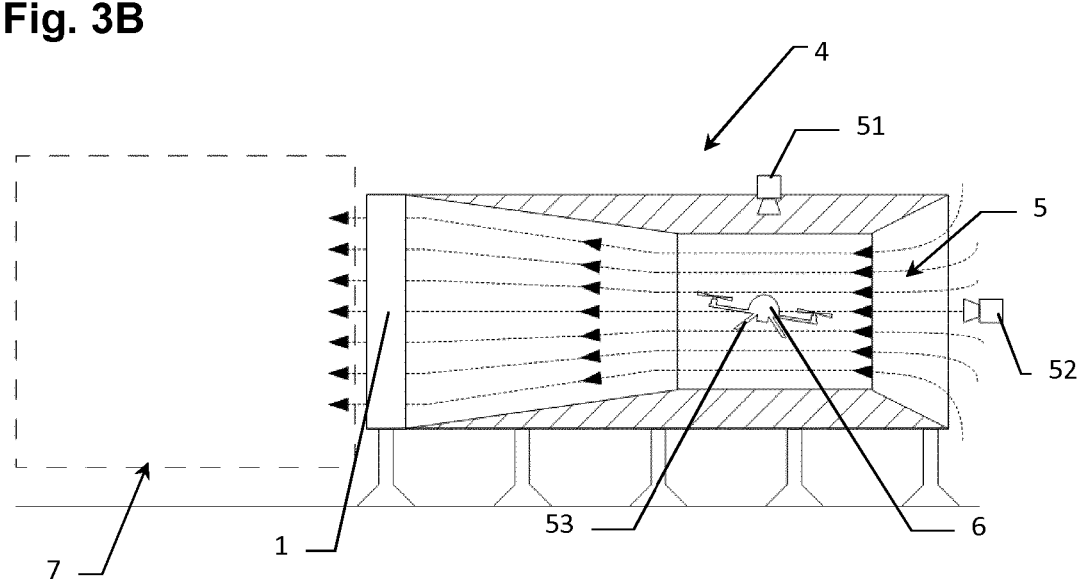
Figure 3C:
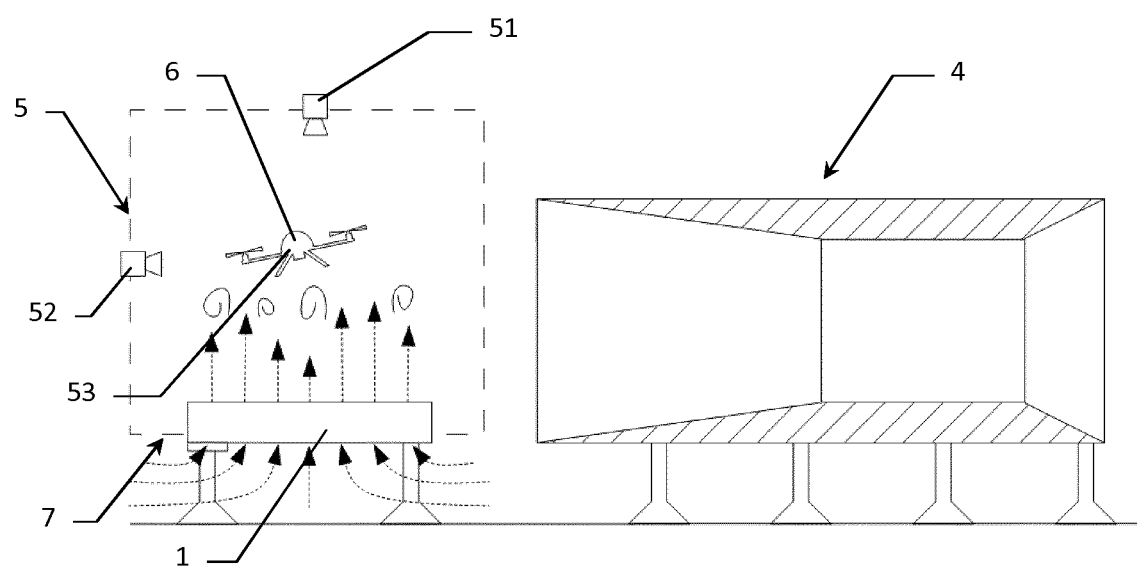

FIGS. 3A to 3C represent a side view of a particular wind test facility 4 for small air-vehicles 6 comprising a wind generation means 1 according to the first aspect of the invention.

The wind test facility here is a 3 in 1 apparatus comprising a wind generation means 1 of the invention and wind tunnel housing on one side (here aspirating side). The housing comprises the above described three portions, converging, laminar and diverging and, as shown in FIG. 3B permits the drone to be tested in a regular laminar flow. On the other side of the wind generation means 1 is an open duct wind tunnel that is the drone can be tested in a turbulent flow as shown by the arrows. The difference between FIGS. 3A and 3C is explained below by the pivoting means.

As one can see, the drone 6 can be placed on the fan blowing side for turbulent flow (FIG. 3A), on the aspirating side for laminar and steady flow (FIG. 3B) or in a tilted wind with an angled fan structure (FIG. 3C).

FIG. 3A more particularly, shows a test of a drone with shear and gusty flow, as represented by the arrows and the curves in volume 7 of FIG. 3A. These shears and guts are generated thanks to the individual control of each wind generation unit 11 both in time and in wind force, or even wind direction. By wind direction, it is meant that thanks to the individual control, it is possible to control some wind generation unit so as to invert their flow direction. Thanks to the absence of bounding walls in volume 7, the drone is permitted to have a free flight within the turbulent air flow path. Also, as represented, the wind test facility 4 further comprises a position sensing means 5 for the small air-vehicle 6, or drone, adapted to detect the position of the small air-vehicle 6 in relation to the wind test facility 4. More particularly, as represented in the figures, the position sensing means 5 for the small air-vehicle comprises a system including two vision camera 51, 52, as for example Vicon Camera System or the like, tracking the air-vehicle 6. Alternatively, or in addition to this system, the position sensing means 5 may comprise an air-vehicle-embedded sensor 53. The sensor can be a physical sensor but can also be a generated GPS signal representing the position and the altitude of the drone of course. Thanks to these sensing means 5 and to a calculating means comprised in the facility 4, it is possible to calculate aerodynamic forces acting on the small air-vehicle 6 based on signals of said position sensing means 5 for said small air-vehicle 6, preferably in addition with data from the engine of the drone for said small air-vehicle, an accelerometer and a gyroscope inside said drone, as it acts as an emulated GPS.

Further, although not represented in the figures, the wind test facility 4 further preferably comprises a specific weather condition generating means adapted to introduce a weather condition within the air flow path. An example of specific weather condition comprises rain, hail, dust or the same.

As we can see in the FIGS. 3A and 3C, the air flow path is an open-duct wind tunnel located in volume 7. This means that the air flow path is not limited by any type of walls. This is possible since all wind generation units 11 are individually controlled and the outermost wind generation units 11 can be controlled so as to generate a wind helping in keeping the small air-vehicle 6 within the air flow path. The absence of walls permits the small air-vehicle 6 to perform unconstrained maneuvers without the risk of colliding. Also, without these barriers, the generated weather conditions do not damage the facility.

According to a preferred embodiment shown in FIG. 3C, the wind generation means 1 comprises pivoting means so as to be movable so as to modify the direction of the air flow path. More particularly, in FIG. 3C, we can see that the wind generation means 1 has been pivoted from a vertical position, thus having a horizontal flow path, to a horizontal position, thus having a vertical flow path. This is possible thanks to the absence of walls that would have hindered the movement of the wind generation means 1. With such a pivot movement, the wind generation means 1 can test much more situations than a conventional wind tunnel. The pivoting means are conventional ones and preferably include an automatic controller and a motor; however, this is not mandatory. While FIG. 3C shows a pivot movement of the wind generation means 1 of 90°, the angle of pivot may be different so as to merely modify the orientation of the flow path. Please also note that, even if FIG. 3C shows a pivot movement of the entire wind generation means 1, one can provide the pivoting means such that only at least one portion of the wind generation means 1, described above as a wind generation wall 1', can be moved with respect to the at least one other portion that remains in its original position.

FIG. 3B shows another embodiment of the invention where the test facility 4 actually further comprises, on one side, a laminar housing which comprises boundary walls, i.e. an intake section, a laminar section, where the speed of the wind is increased thanks to the constriction of the flow's cross section, and a divergent section. The facility can therefore also be used for conventional aerodynamic testing. In this fast and laminar section, the drone is not attached to a balance in opposition to the conventional wind tunnel. Here the drone flies autonomously using the emulated GPS signal. Tracking the position of the drone and using data from its internal sensors allows to calculate aerodynamics efforts as described for the blowing side test section.

While the present invention is described above in connection with preferred embodiments that are illustrated by the appended drawings, it will be understood that it is not so limited to the described or illustrated embodiments, but by the scope of the appended claims. For example, the wind generation means 1 is not limited to any type of fan, to any size or shape of the walls it forms, or to any type of controlled profile of wind to be generated.

The invention claimed is:

1. Wind generation means comprising
at least one wind generation wall comprising
a plurality of wind generation units provided next to each other along at least a first and a second directions so as to form the at least one wind generation wall,
wherein each wind generation unit of said plurality of wind generation units comprises at least two ventilation units, each ventilation unit within the wind generation unit being individually controlled,
characterized in that each wind generation unit of said plurality of wind generation units comprises at least one control unit adapted to control said ventilation units individually, so as to generate an arbitrary wind profile both in space and in time in an air flow path and so as to vary a generated wind physical property of said each wind generation unit along said at least first and second directions, and in that said plurality of wind generation units are detachably attached to each other so that the size and shape of the said wind generation wall can be varied.

2. Wind generation means according to claim 1, wherein each ventilation unit is composed of two contra-rotative ventilation fans mounted in series.

3. Wind generation means according to claim 1 further comprising, in the air flow path, a first frame having a honeycomb structure and a second frame providing a plurality of homogenization chambers mounted to the wind generation units.

4. Wind generation means according to claim 3, wherein each ventilation unit is provided with its specific homogenization chamber.

5. Wind test facility for small air-vehicles comprising a wind generation means according to claim 1.

6. Wind test facility according to claim 5, further comprising a position sensing means for a small air-vehicle adapted to detect the position of said small air-vehicle in relation to the wind test facility.

7. Wind test facility according to claim 6, wherein the position sensing means for the small air-vehicle comprises at least one of a vision camera system and an air-vehicle-embedded sensor.

8. Wind test facility according to claim 5, further comprising a calculating means for calculating aerodynamic forces acting on the small air-vehicle based on signals of said position sensing means for said small air-vehicle.

9. Wind test facility according to claim 5, further comprising a specific weather condition generating means adapted to introduce a weather condition within the air flow path.

10. Wind test facility according to claim 5, wherein an air flow path is an open space.

11. Wind test facility according to claim 5, wherein said wind generation means comprises pivoting means.

* * * * *